US00RE38056E

(19) United States
(12) Reissued Patent
Van Dun

(10) Patent Number: US RE38,056 E
(45) Date of Reissued Patent: Apr. 1, 2003

(54) APPARATUS FOR ADJUSTING THE LIP OPENING OF AN EXTRUSION DIE

(75) Inventor: Guillaume Van Dun, Temse (BE)

(73) Assignee: Constructiewerkhuizen G. Verbruggen, Temse (BE)

(21) Appl. No.: 09/103,321

(22) Filed: Jun. 23, 1998

Related U.S. Patent Documents

Reissue of:
(64) Patent No.: 4,726,752
Issued: Feb. 23, 1988
Appl. No.: 06/884,086
Filed: Jul. 10, 1986

(30) Foreign Application Priority Data

Jan. 14, 1986 (BE) ..... 2/60904

(51) Int. Cl.[7] ..... B29C 47/92; B29C 47/16
(52) U.S. Cl. ..... 425/141; 264/40.5; 264/40.7; 264/40.2; 264/40.6; 425/144; 425/145; 425/162; 425/378.1; 425/378 R; 425/379 R
(58) Field of Search ..... 425/141, 143, 425/144, 145, 162, 378.1; 264/40.1, 40.5, 40.6, 40.7

(56) References Cited

U.S. PATENT DOCUMENTS

| | | | |
|---|---|---|---|
| 2,769,200 | A | 11/1956 | Longstreth et al. |
| 3,261,893 | A | 7/1966 | George et al. |
| 3,775,035 | A | 11/1973 | Scotto et al. |
| 3,819,775 | A | 6/1974 | Mules |
| 3,920,365 | A | 11/1975 | Mules |
| 3,940,221 | A | 2/1976 | Nissel |
| 4,252,519 | A | 2/1981 | Farmer et al. |
| 4,281,980 | A | 8/1981 | Hoagland et al. |
| 4,454,084 | A | 6/1984 | Smith et al. |

FOREIGN PATENT DOCUMENTS

| | | |
|---|---|---|
| GB | 2 016 357 | 9/1979 |
| JP | 51-61562 | 5/1976 |
| JP | 58-65631 | 4/1983 |
| JP | 59-16722 | 1/1984 |
| JP | 59-182706 | 10/1984 |
| JP | 60-172517 | 9/1985 |

*Primary Examiner*—Mark Eashoo
(74) *Attorney, Agent, or Firm*—Darby & Darby

(57) ABSTRACT

Method of adjusting the lip opening of an extrusion die for stratiform material, with the characteristic that it consists in the combination of, on the one side, the control of the heating of bar shaped elements (9) which act upon at least one of the lips (6–7) of the lip opening (5), in function of the thickness of the formed material, and on the other hand, the common cooling of several bar shaped elements (9) by forcing a cooling medium along these elements (9).

25 Claims, 3 Drawing Sheets

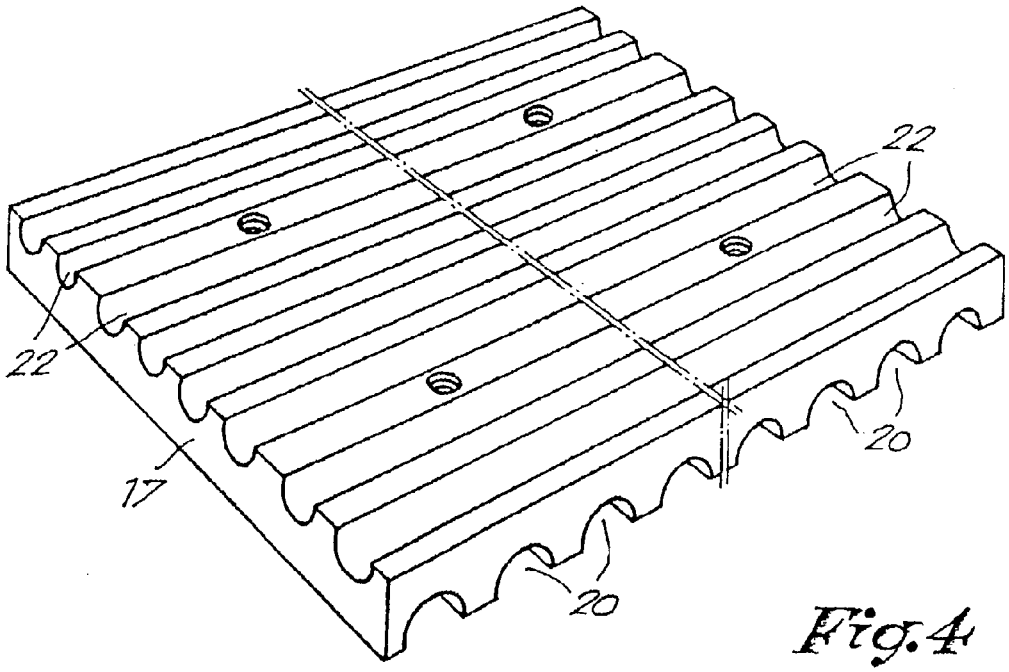
Fig. 4
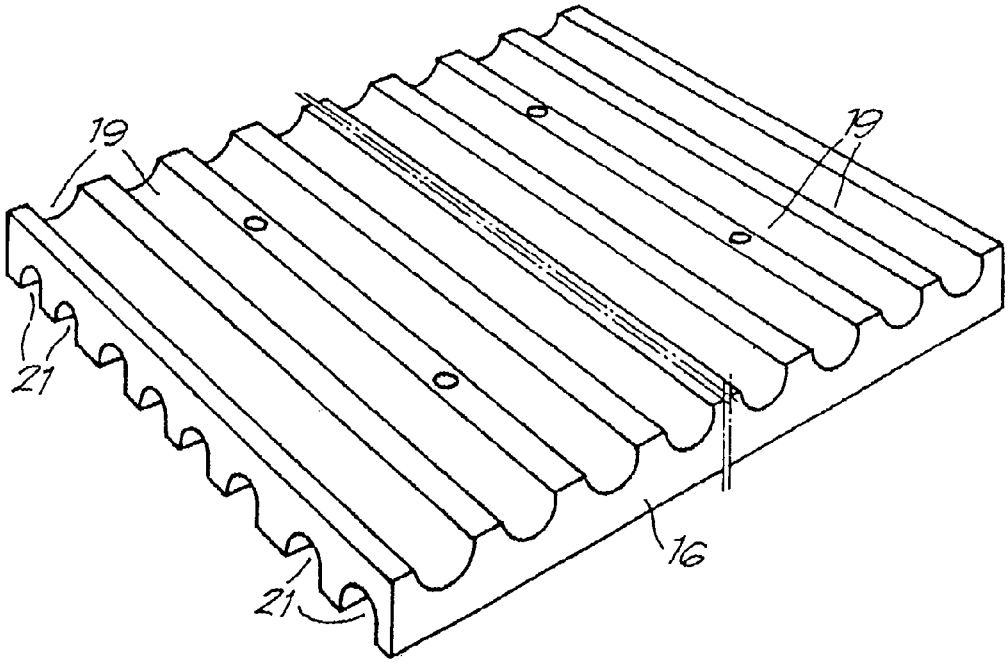

APPARATUS FOR ADJUSTING THE LIP OPENING OF AN EXTRUSION DIE

Matter enclosed in heavy brackets [ ] appears in the original patent but forms no part of this reissue specification; matter printed in italics indicates the additions made by reissue.

*This application is a Reissue of application Ser. No. 06/884,086, filed Jul. 10, 1986, now U.S. Pat. No. 4,726,752 granted on Feb. 23, 1988.*

This invention relates to a method of adjusting the lip opening of an extrusion die for stratiform material, particularly for extrusion dies of the type that mainly consists of, on the one side two lips and the like, forming the lip opening, and on the other hand, a number of control units put across the width of the lip opening, which all consist of one or more bar shaped elements, expansive by heat, respectively shrinkable by cooling which act upon at least one the lips in order to displace them and to change the lip opening. These dies are appropriate for the extrusion of film and coating as well as for the extrusion of sheet and the like.

An extrusion die of said type is known from the U.S. Pat. No. 3,940,221. This known extrusion die mainly consists of a die block in which an oblong opening is provided through which a more or less liquid material may be pressed by extrusion to form a layer, whereby the opening is limited on one side by flexible lip which may be moved by expansive, respectively shrinkable, bar shaped elements in order to modify the opening width. The heating, respectively the cooling, of the bar shaped elements is hereby done by means of heat-conducting blocks which are provided individually for each bar shaped element, and which, parallel to the bar shaped elements, each consist of a heating element and a cooling channel.

Although such an arrangement theoretically enables a proper control of the lip opening, it shows the practical difficulty of distributing the cooling medium over a large number of cooling channels in such a manner that approximately the same amount of cooling medium is delivered to each cooling channel. So it is rather difficult to provide a uniform cooling effect in all the bar shaped elements.

Moreover, such an arrangement shows the disadvantage that, when one cooling channel fails, the corresponding bar shaped element doesn't receive any more cooling at all. The increased activity of this element, originated by this condition, also influences the adjacent bar shaped elements, which eventually results in a total deranging of the system.

At the same time, with the known arrangement, the cooling channels are located between the bar shaped elements and the heating elements. From this the disadvantage arises that a considerable supply of energy to the heating elements is required to provide the bar shaped elements with an encreased heat supply, opposite to the cooling.

Further, this known extrusion die also shows the disadvantage that the control of the lip opening is very susceptible to the changes of the ambient parameters. This is, amongst other things, due to the fact that the bar shaped elements, in order to fasten them, are in contact with the die block over a comparatively large distance, so that a considerable heat bridge is existing between the die block and these elements.

Thus, the present invention also relates to an extrusion die for the extrusion of film, coating, sheet and the like, showing none of the said disadvantages nor other ones.

The present extrusion die has the advantage that in the surroundings of the bar shaped elements a considerable uniformity of the temperature is reached, whereby also various temperature influences, by air currents and head bridges, are leveled out. By this, one obtains also a uniform radiation of heat to drums possibly positioned in the surroundings of thee die, so that the disadvantage of the so called hot spots is avoided. Another advantage of the extrusion die according to the present invention consists in the possibility of operating with lower mean temperatures of the bar shaped elements, so that one obtains that the temperatures of the system may be adjusted in such a manner that the time constant of the cooling is almost equal to the mean time constant of the heating of the bar shaped elements. As it is known, this is a primary requirement to enable a proper control. By an operation at lower temperatures a smaller difference between the temperature of the device and the ambient air is obtained, whereby the influence of the surroundings on the system is considerably reduced. The extrusion die also shows the advantage that the bar shaped elements are very well shielded against external influences, whereby it is obtained that, when the control system and/or the power supply fail the extrusion die easily may continue to operate by means of manual control.

The extrusion die according to the invention shows also the advantage that, thanks to the method applied to control the lip opening and more specially to cool the bar shaped elements, the bar shaped elements keep receiving a sufficient cooling when one cooling channel fails.

The said advantages are mainly obtained by the application of a method for the control of the lip opening of an extrusion die, whereby the extrusion die is of the type that mainly consists of, on the one side, two lips forming the lip opening, and on the other hand, a number of control units put across the width of the lip opening which all consist of at least one bar shaped element, expansive by heating, respectively shrinkable by cooling which act upon at least one of the lips in order to displace them and to change the lip opening, and whereby the method for the control mainly consists of the combination of, on the one side, the control of the heating of the bar shaped elements by each control unit in function of the local thickness checks which are carried out across the width of the formed layer of material, and on the other hand, the common cooling of several control units by forcing cooling medium mainly transversely along several bar shaped elements.

According to a preferred method according to the invention also the temperature of the common cooling medium at the supply thereof will be controlled in combination with the said common cooling.

In view of a better demonstration of the characteristics, hereafter, as examples without any restrictive character, some preferred embodiments are described referring to accompanying drawings, wherein:

FIG. 1 lines out the followed method for the adjustment of the lip opening of the extrusion die;

FIG. 4 shows a perspective drawing of the cooling blocks which are used in the embodiment according to the FIGS. 2 and 3;

Figure 1:
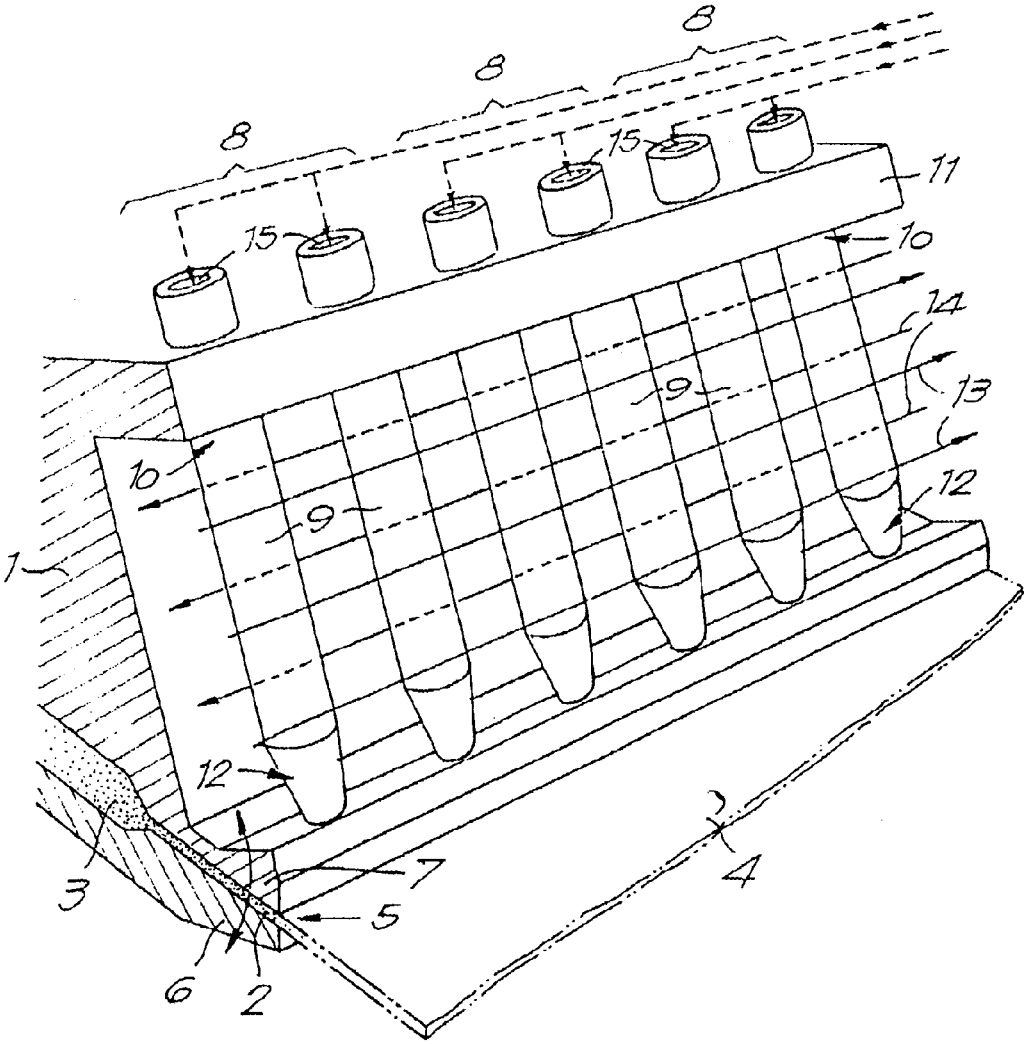

As outlined in FIG. 1 the extrusion die consists mainly of a die block 1 showing an extrusion discharge opening 2 along which more or less liquid material 3 by means of extrusion may be pressed into a layer 4. Hereby the lip opening 5 of the extrusion discharge opening 2 is determined by means of two lips, respectively 6 and 7, whereby according to these embodiments the upper lip 7 is executed elastic and flexible. Further, across the width of the lip opening 5 a number of control units 8 fitted, each consisting of one or more bar shaped elements, expansive by heat, respectively shrinkable by cooling which may co-operate on one end with a steady support 11, whilst they may co-operate on the other end 12 with the said elastic lip. Hereby the bar shaped elements 9, according to the type of embodiment, apply either a compression of or a tension on the elastic lip.

The most important characteristic feature of the present invention consists in the control of the lip opening 5 according to a method which mainly consists in the combination of, on the one side, the control by each control unit 8 of the heating of the bar shaped elements 9, and on the other hand, the common cooling of several control units by forcing a cooling medium mainly transversely along several bar shaped elements 9. This movement of the cooling medium is outlined in FIG. 1 by means of the arrows 13 and 14. As a matter of fact a lot of variants are possible to force the cooling medium transversely with respect to the bar shaped elements 9, which will be described further hereafter.

Another important characteristic of the preferred embodiment of the invention consists in the heating of the bar shaped elements 9 by means of heating elements 15 which are put internally in the bar shaped elements 9 and which are controlled by each control unit 8.

Figure 2:
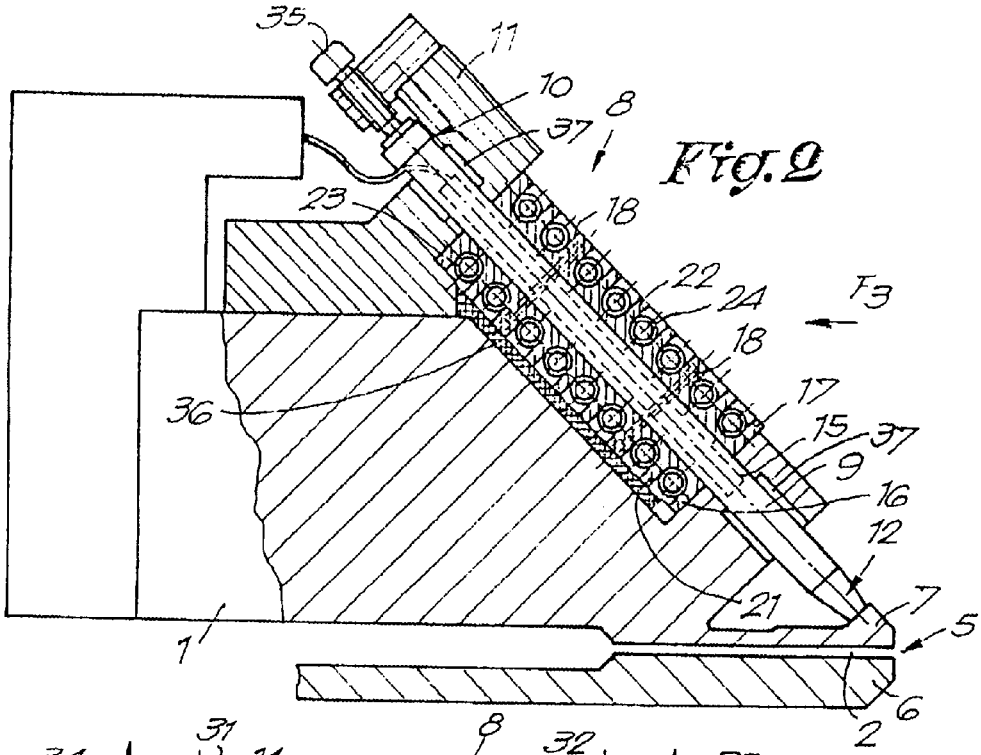
FIG. 2 shows a section of an extrusion die for the embodiment of the method according to the invention.
Figure 3:
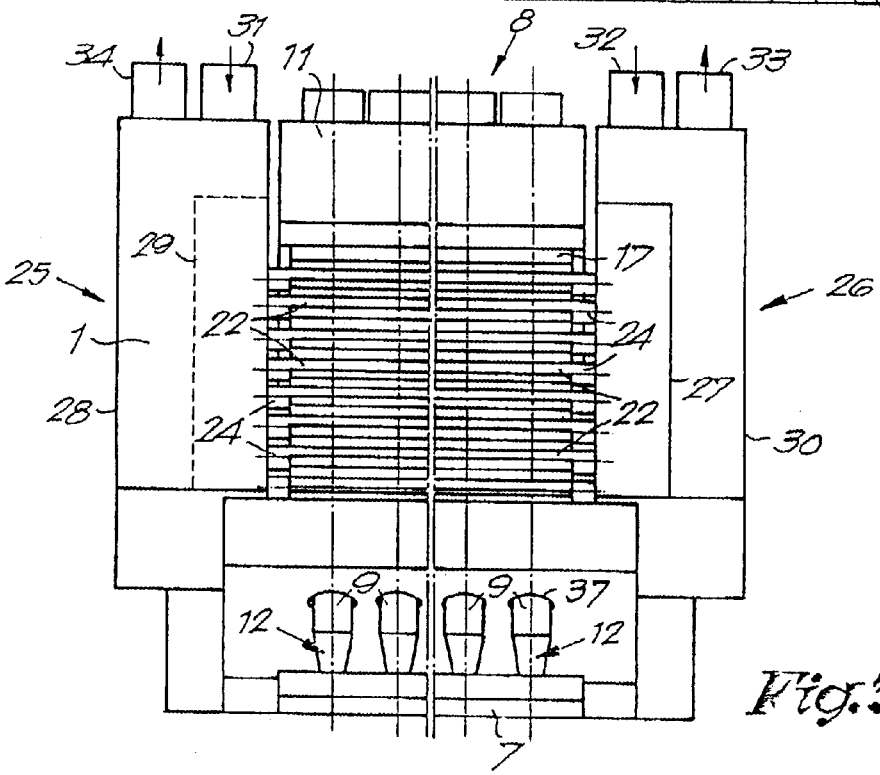
FIG. 3 shows a side view according to arrow F3 in FIG. 2.

In FIGS. 2, 3, and 4 a practical embodiment is shown. Hereby the extrusion die shows mainly the same characteristics as outlined in FIG. 1.

In order to provide the transversal cooling, two cooling blocks, respectively 16 and 17, are employed, of several adjacent sets of each time two of such cooling blocks 16 and 17 which may be fastened against each other, e.g. by means of bolts 18, thereby enclosing the bar shaped elements 9. For this purpose each of these cooling blocks 16 and 17 are provided with opposite semicircular recesses 19 and 20 which may enclose tightly the bar shaped elements 9. Transversely with respect to these recesses 19 and 20 a number of hollowings, respectively 21 and 22, wherein cooling channels are provided, respectively 23 and 24, are applied.

The extrusion die is provided with means, respectively 25 and 26, to provide the supply and the discharge of a cooling medium. As shown in FIG. 3 according to this embodiment the means 25 and 26 consist of four collectors 27, 28, 29 and 30. Hereby the cooling channels 24 of the external cooling block 17 are connected with their inlets and outlets respectively to the collectors 27 and 28, while the cooling channels 23 of the internal cooling block 16 are connected with their inlets and outlets respectively to the collectors 29 and 30. Further inlets 31 and 32, as well as outlets 33 and 34 are properly provided to the said collectors in order to provide the supply and discharge of the cooling medium.

The direction of flow of the cooling medium in the external cooling block 16 is opposite to the direction of flow of the cooling medium in the internal cooling block 16.

According to the preferred embodiment the bar shaped elements 9 are fastened with their lower ends 12 and their upper ends 10 between respectively the upper lip 7 of the lip opening 5 and bolts 35 which are screwed in the steady support 11. The bolts 35 allow a manual adjustment of the lip opening 5.

To avoid the control units 8 causing modifications of the temperature in the actual die block 1, an insulating layer 36 is put between each internal cooling block 16 and the die block 1. To limit the influences from outside also an insulating layer may be put at the exterior, e.g. against each external cooling block 17. To avoid the expansion or shrinkage of the bar shaped elements 9 by the fluctuations of the ambient temperature according to the present invention the contact surfaces between the bar shaped elements 9 and the die block 1 are preferably minimized. According to the FIGS. 2 and 3 this realized by the application of concentric recesses 37 in the die block 1 around the bar shaped elements 9.

The bar shaped elements 9 are internally provided with preferably electric heating elements 15 whereby, not shown on the figures, means are applied to control the supply of the electric energy to said heating elements. These means mainly consist of an voltage level control, an adjustable pulse generator or a frequency regulator.

The control of the heating elements may be done according to prior art manually as well as automatically in function of the measurement of the thickness of the manufactured layer 4. This measurement may be realised according to the prior art by means of mechanical sensors, radiation sensitive detectors or other measuring techniques. This measurement may be executed by hand or automatically.

The cooling medium according to the invention may be a gas or a liquid, e.g. air or water. According to the invention the temperature of the cooling medium may be controlled. Naturally, in the latter case a temperature control is provided to the supply, e.g. a cooling device, which is not shown in the figures. Such a control has the advantage that one can intervene very quickly in case of an unwished disturbance, in this way, in the event that a bar shaped element 9 gets overheated, due to any possible reason, may be prevented that the lip opening 5 gets locally closed and the layer 4 is interrupted, by providing an abrupt decrease of the temperature of the cooling medium.

Naturally such a temperature control of the cooling medium on itself is also applicable to the prior art extrusion dies.

It is obvious that the transversal cooling according to the invention may occur in an other manner than described above. In such a way, e.g. the directions of flow of the cooling medium in the cooling channels of the internal and the external cooling blocks, respectively 16 and 17, may be identical to each other.

According to another variant of the invention the transversal cooling channels may be combined at their ends in such a way that they show a course with a meander form.

According to a variant the extrusion die comprises or more single or composite cooling blocks, in other words whereby no separate internal and external cooling blocks are used. Then traverse bore holes are provided instead of the said recesses 19 and 20 into which the bar shaped elements 9 are put. It is obvious that the extrusion die may be provided with several cooling blocks which are put in juxtaposition, whereby each said cooling block e.g may be bipartite and may consist of an internal and an external cooling block 16 and 17, either can be one-piece on itself, or may have any other shape and composition. Between the adjacent cooling blocks preferably a small free space is left, on order to allow the expansion of the cooling blocks.

According to another variant which is not shown in the figures the cooling channels 23–24 are provided, on the ends which are positioned in opposition to the bar shaped elements 9, with cooling fins which are shielded with sheets. The in this manner formed additionally cooling channels are fed by means of a forced air current.

According to still another variant the cooling blocks are provided with cooling channels which are exclusively formed by the said shielded fins.

There is no need to do the heating of the bar shaped elements 9 by means of electric heating elements, and in other words it may be achieved in any manner, e.g. by means of oil or by heating by ultrasonic vibrations.

It is obvious that the lower lip 6 as well as the upper lip 7, or both lips 6 an 7, may be provided with the said control of the lip opening.

Naturally the invention relates also to extrusion dies with several distribution channels, whereby possibly different kinds of material 3 are pressed through the same extrusion opening 2, as well as to dies which have several extrusion openings 2 adjacent to or above each other. The invention is also applicable with extrusion dies whereby a multilayered extrude is formed.

The present invention is by no means limited to the embodiment described as examples and shown in the accompanying drawings, but such an extrusion die as well as the composing parts thereof may be realised in all kinds of forms and dimensions without leaving the scope of the invention.

I claim:

1. An apparatus for adjustment of a lip opening of an extrusion die, comprising*:* at least two lip elements [each having a longitudinal axis, said two lip elements] defining a lip opening therebetween, *said lip opening having a width,* a plurality of control units positioned at an angle to said [longitudinal axes] *width* of said lip [elements] *opening, each of said control units including*

*a bar shaped element,* a heat expanding arrangement *including a heating element for said bar shaped element* for [increasing] *decreasing* a thickness of said lip opening by means of thermal expansion of said

*bar shaped element of a said* control unit[s connected] *upon heating* to *engage* one of said lip elements, a contracting arrangement *comprising a pair of opposing cooling blocks fastened against each other enclosing said bar shaped elements of said plurality of control units* for [decreasing of] *increasing* the thickness of said lip opening by means of cooling [of] said plurality *of* control units by forcing a cooling medium *to flow in at least one cooling channel of a said cooling block* transversely to said plurality of control units.

[2. An apparatus according to claim 1 wherein each said control unit is a bar shaped element movably attached to one of said lip elements.]

3. An apparatus according to claim [2] *1* wherein said bar shaped element [is attached to] *engages* an outside free end of said *one* lip element.

4. An apparatus according to claim [2] *1* wherein at least one heating element [of said heat expanding arrangement] is attached along each of the bar shaped elements and controlled by the [individual] *corresponding* control unit [and at least one cooling channel of said contracting arrangement extends transversely to said bar shaped elements].

5. An apparatus according to claim 4 wherein [said contracting arrangement comprises] at least one cooling block [having] *has* at least one recess adapted to accommodate said bar shaped element, at least one opening positioned transversely to said recess is positioned within said cooling block, said opening receiving *a* said cooling channel.

6. An apparatus according to claim [4] *5* wherein a plurality of said recesses and openings are situated within said *at least one* cooling block.

[7. An apparatus according to claim 6 wherein said two cooling blocks are employed by said contracting arrangement, said cooling blocks are fastened against each other enclosing said bar shaped elements.]

8. An apparatus according to claim [7] *1* wherein said cooling medium in [the] cooling channels of said two cooling blocks flows in the same direction.

9. An apparatus according to claim [8] *1* wherein said cooling medium in [the] cooling channels of one of said cooling block flows in the direction opposite to the direction of the flow of said cooling medium in [the] cooling channels of the other block.

10. An apparatus according to claim 9 wherein said cooling channels exist[s] in at least one internal and one external cooling block.

11. An apparatus according to claim 9 wherein a plurality of cooling channels are situated outside a die block along the bar shaped elements.

12. An apparatus according to claim [7] *1* wherein means providing a supply of the flow of the cooling medium consists of at least one collector to which the inlets of the cooling channels are connected and at least one collector to which the outlets of the cooling channels are connected, whereby the cooling medium is fed in the first collector.

13. An apparatus according to claim [9] *11* wherein the direction of flow of the cooling medium in [the] cooling channels, positioned along an outside portion of the die block along the bar shaped element, is opposite to the direction of the flow in [the] cooling channels applied between the die block and the bar shaped elements.

14. An apparatus according to claim [7] *1* wherein all cooling channels are situated within at least one cooling block having a plurality of transverse bore holes receiving said bar shaped elements.

15. An apparatus according to claim [7] *1* wherein the cooling channels are provided with cooling fins covered by means of a sheet, whereby a forced air stream is guided along the fins.

16. An apparatus according to claim [7] *1* wherein the cooling channels are formed by cooling fins on the cooling blocks and which are covered by means of sheets.

17. An apparatus according to claim [7] *1* wherein at least between the cooling blocks and a die block an insulating layer is provided.

18. An apparatus according to claim [7] *1* wherein the bar shaped element cooperates at one end with a support and at another end [cooperatse] *cooperates* with [the] *said one* lip element.

19. An apparatus according to claim 14 wherein at least one said lip element consists of a flexible elastic lip adapted to receive a pressure from one end of said bar shaped element while the other end of said bar shaped element pushes against fasteners positioned within the support.

20. An apparatus according to claim [19] *11* where in the die block concentric recesses are made around the bar shaped elements.

21. An apparatus according to claim [7] *1* wherein the heating elements are put internally in the bar shaped elements.

22. An apparatus according to claim 21 wherein the heating elements consist of electric heating elements.

23. An apparatus according to claim 22 wherein each control unit [means] is provided to control an electric power supply to the heating elements and thus the bar shaped elements.

24. An apparatus according to claim 23 wherein the means to control the supply of the electric energy consists of a voltage level control.

25. An apparatus according to claim 24 wherein the means to control the supply of the electric energy consist of an adjustable pulse generator.

26. An apparatus according to claim 24 wherein the means to control the supply of the electric energy consist of a frequency generator.

27. An apparatus according to claim [7] *1* wherein the control of the heating elements is performed automatically by means of a measuring device controlling the local thickness across the complete width of a fabricated layer.

* * * * *